(12) United States Patent
Damian

(10) Patent No.: US 6,523,877 B1
(45) Date of Patent: Feb. 25, 2003

(54) VEHICLE STORAGE BOX ASSEMBLY

(76) Inventor: Gerald M. Damian, P.O. Box 130072, Elmwood Park, IL (US) 60707

( * ) Notice: Subject to any disclaimer, the term of this patent is extended or adjusted under 35 U.S.C. 154(b) by 0 days.

(21) Appl. No.: 10/108,312

(22) Filed: Mar. 28, 2002

(51) Int. Cl.[7] .................................................. B60R 9/00
(52) U.S. Cl. ...................................... 296/37.6; 224/404
(58) Field of Search .............................. 296/37.6, 39.2; 224/403, 404, 405

(56) References Cited

U.S. PATENT DOCUMENTS

| | | |
|---|---|---|
| D294,935 S | 3/1988 | Grossman |
| 4,770,330 A | 9/1988 | Bonstead et al. |
| 4,991,899 A * | 2/1991 | Scott ........................ 296/39.2 |
| 5,848,818 A * | 12/1998 | Flueckinger ............... 296/37.6 |
| 5,893,599 A | 4/1999 | Strohfeldt |
| D411,164 S | 6/1999 | Harris |
| 5,944,372 A * | 8/1999 | Gilbert ....................... 296/37.6 |
| 5,947,356 A * | 9/1999 | Delong ....................... 296/37.6 |
| 6,003,923 A | 12/1999 | Scott et al. |
| 6,139,080 A | 10/2000 | Saffold |

* cited by examiner

Primary Examiner—D. Glenn Dayoan
Assistant Examiner—Jason Morrow

(57) ABSTRACT

A vehicle storage box assembly for securely attaching to a pick up truck bed without having to drill holes in the truck. The vehicle storage box assembly includes a box having a main portion and a grooved bottom surface complimentary to grooves in the pickup bed. The storage box further has a plurality of jamb blocks to hold the grooves of the storage box into engagement with the grooves of the bed.

8 Claims, 4 Drawing Sheets

VEHICLE STORAGE BOX ASSEMBLY

BACKGROUND OF THE INVENTION

1. Field of the Invention

The present invention relates to vehicle storage boxes and more particularly pertains to a new vehicle storage box assembly for securely attaching to a pick up truck bed without having to drill holes in the truck.

2. Description of the Prior Art

The use of vehicle storage boxes is known in the prior art. U.S. Pat. No. 6,139,080 describes a storage box having a smooth bottom face and an upper protrusion adjacent a lid for insertion into a gap in the side wall of the truck of a pickup bed. Another type of vehicle storage box is U.S. Pat. No. 6,003,923 also having an upper protrusion to conform to the interior shape of the bed of the pickup truck. U.S. Pat. No. 4,770,330 shows a multi-piece storage box for straddling a wheel well in a bed of a pickup truck. U.S. Pat. No. 5,893,599 shows a storage box using stair step shaped brackets for attaching to opposite side rails of the pickup truck bed. U.S. Pat. No. Des. 411,164 and U.S. Pat. No. Des. 294,935 each show an ornamental design for a storage box.

While these devices fulfill their respective, particular objectives and requirements, the need remains for a storage box that is easily installed in the pickup bed of a pickup truck without the need to make new holes in the truck walls or bed.

SUMMARY OF THE INVENTION

The present invention meets the needs presented above by providing a box having a main portion and a grooved bottom surface complimentary to grooves in the pickup bed. The storage box further has a plurality of jamb blocks to hold the grooves of the storage box into engagement with the grooves of the bed.

An object of the present invention is to provide a new vehicle storage box assembly that is easily installed.

Another object of the present invention is to provide a new vehicle storage box assembly that requires no additional holes be made in the vehicle.

To this end, the present invention generally comprises a box having a main portion and a grooved bottom surface complimentary to grooves in the pickup bed. The storage box further has a plurality of jamb blocks to hold the grooves of the storage box into engagement with the grooves of the bed.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
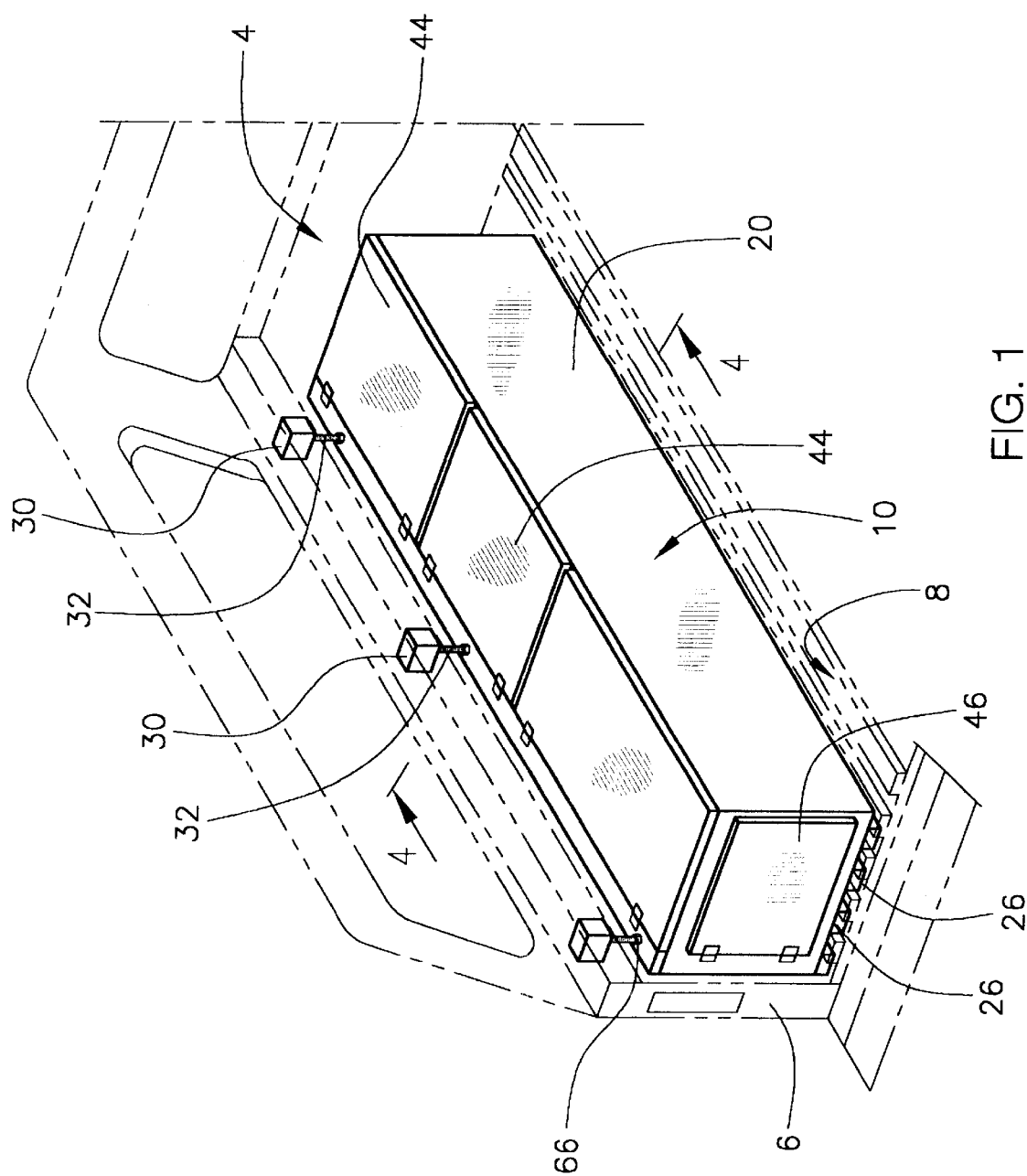
FIG. 1 is a perspective view of a new vehicle storage box assembly according to the present invention.
Figure 2:
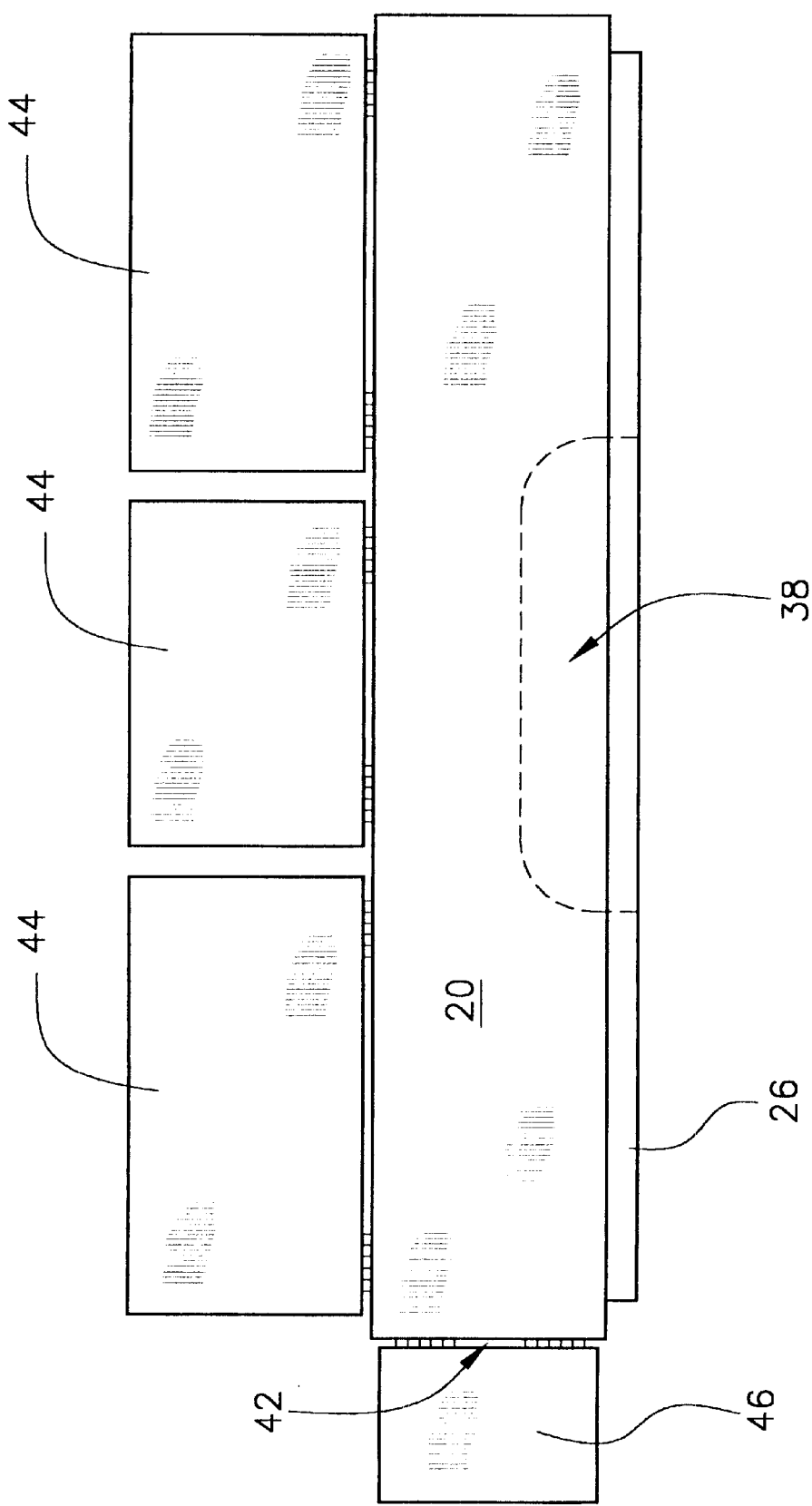
FIG. 2 is a side view of the present invention.
Figure 3:
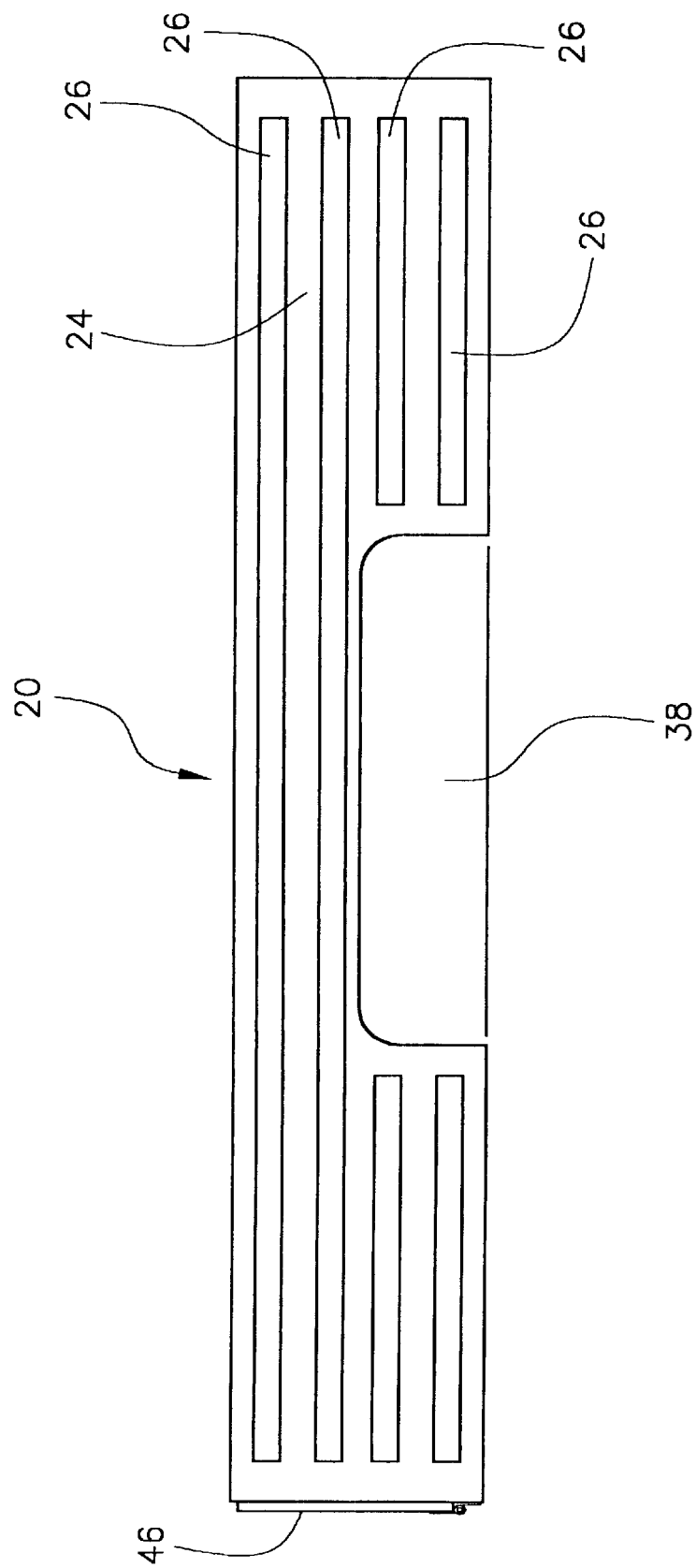
FIG. 3 is a bottom view of the present invention.

With reference now to the drawings, and in particular to FIGS. 1 through 4 thereof, a new vehicle storage box assembly embodying the principles and concepts of the present invention and generally designated by the reference numeral 10 will be described.

Figure 4:
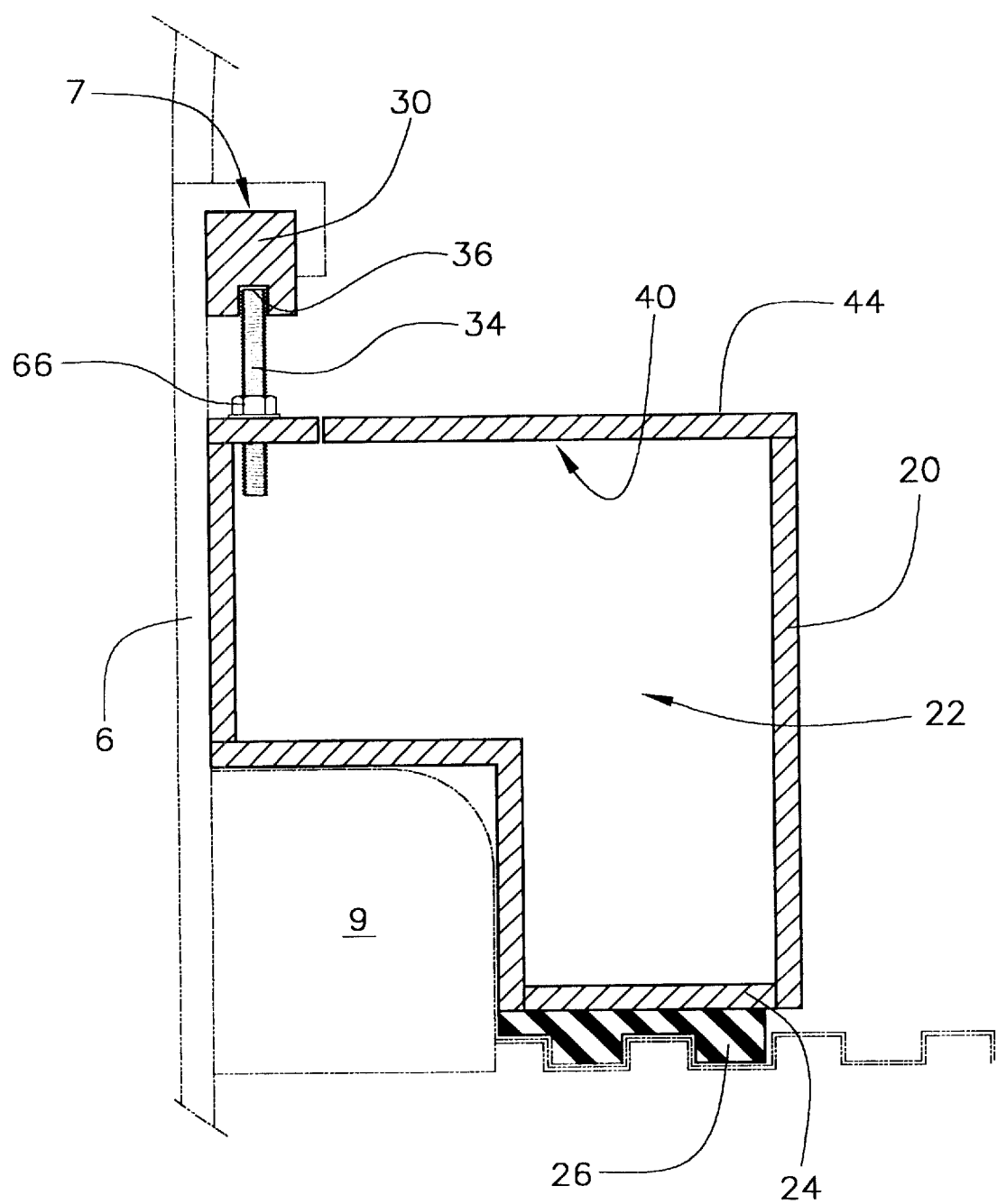
FIG. 4 is a cross-sectional view of the present invention taken along line 4—4 of FIG. 1.

As best illustrated in FIGS. 1 through 4, the vehicle storage box assembly 10 is designed to attach to a vehicle 2 having a bed portion 4 that includes a sidewall 6 and a grooved floor 8. The sidewall 6 has a channel 7 facing the grooved floor 8. The storage box assembly 10 generally comprises a main portion 20 having an interior 22 and a bottom surface 24. A plurality of ribs 26 extend along the bottom surface 24. The ribs may be individual ribs coupled to the main portion (as shown in FIG. 1), integrally extending from the main portion (consistent with the disclosures of FIGS. 2 and 3), or extending from a planar piece of material coupled to the main portion 20 (as shown in FIG. 4). Thus, the bottom surface 24 is designed to be complimentary to the grooved floor 8 for preventing lateral movement of the main portion 20 relative to the grooved floor 8.

A plurality of jamb blocks 30 are provided. Each jamb block 30 is extendably coupled to the main portion 20. Each jamb block 30 is positioned such that each jamb block 30 is designed for extending into the channel 7 in the sidewall 6 when the main portion 20 is positioned adjacent the sidewall 4. Thus, the ribs 26 are prevented from disengaging the grooved floor 8 whereby the main portion 20 is secured to the bed portion 4 of the vehicle 2.

In a preferred embodiment, a plurality of threaded rods 32 are provided. Each threaded rod 32 extends through an associated one of a plurality of complimentarily threaded apertures 34 in the main portion 20. A distal end 36 of each threaded rod 32 is rotatably coupled to an associated one of the plurality of jamb blocks 30 in a conventional fashion such that each threaded rod 32 is rotatable while the associated jamb block 30 is held in a static position relative to the associated threaded rod 32. Thus, each jamb block 30 is extendable from the main portion 20 by rotating the associated threaded rod 32.

A plurality of locking nuts 66 are also provided. Each locking nut 66 is threadedly coupled to a portion of an associated one of the threaded rods 32, either on the interior or exterior of the main portion 20. Each locking nut 66 is positionable adjacent the associated threaded aperture 34 for locking each threaded rod 32 in an extended position.

In an embodiment, the main portion 20 includes an indented portion 38 positioned such that the indented portion 38 receives a wheel well 9 of the vehicle 2 extending into the bed portion 4.

The main portion 20 also includes a top opening 40 and an end opening 42. A plurality of top doors 44 are hingedly coupled to the main portion 20 for selectively covering the top opening 40 in the main portion 20. Alternatively, the top opening 40 may be divided into multiple openings and the interior space of the main portion may be divided into separate interior chambers using interior walls (not shown).

An end door 46 is coupled to the main portion 20 for selectively covering the end opening 42 in the main portion 20.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A storage box for a vehicle having a bed portion that includes a sidewall and a grooved floor, the sidewall having a channel facing the grooved floor, said storage box comprising:

a main portion having an interior and a bottom surface;

a plurality of ribs extending along said bottom surface whereby said bottom surface is adapted to be complimentary to the grooved floor for preventing lateral movement of said main portion relative to the grooved floor;

a jamb block extendably coupled to said main portion, said jamb block being positioned such that said jamb block is adapted for extending into the channel in the sidewall when the main portion is positioned adjacent the sidewall whereby said ribs are prevented from disengaging the grooved floor whereby said main portion is secured to the bed portion of the vehicle; and a threaded rod extending through a complimentarily threaded aperture in said main portion, a distal end of said threaded rod being rotatable coupled to said jamb block such that said threaded rod is rotatable while said jamb block is held in a static position relative to said threaded rod whereby said jamb block is extendable from said main portion by rotating said threaded rod.

2. The storage box of claim 1, further comprising:

a locking nut threadedly coupled to a portion of said threaded rod, said locking nut being positionable adjacent said threaded aperture for locking said threaded rod in an extended position.

3. A storage box for a vehicle having a bed portion that includes a sidewall and a grooved floor, the sidewall having a channel facing the grooved floor, said storage box comprising:

a main portion having an interior and a bottom surface;

a plurality of ribs extending along said bottom surface whereby said bottom surface is adapted to be complimentary to the grooved floor for preventing lateral movement of said main portion relative to the grooved floor;

a jamb block extendably coupled to said main portion, said jamb block being positioned such that said jamb block is adapted for extending into the channel in the sidewall when the main portion is positioned adjacent the sidewall whereby said ribs are prevented from disengaging the grooved floor whereby said main portion is secured to the bed portion of the vehicle; and wherein said main portion includes an indented portion positioned such that said indented portion is adapted for receiving a wheel well extending into the bed portion of the vehicle.

4. The storage box of claim 1 further comprising:

a plurality of doors, each of said doors being coupled to said main portion for selectively covering an opening in said main portion.

5. The storage box of claim 4 wherein one of said plurality of doors is an end door for covering an end opening in said main portion.

6. A storage box for a vehicle having a bed portion that includes a sidewall and a grooved floor, the sidewall having a channel facing the grooved floor, said storage box comprising:

a main portion having an interior and a bottom surface;

a plurality of ribs extending along said bottom surface whereby said bottom surface is adapted to be complimentary to the grooved floor for preventing lateral movement of said main portion relative to the grooved floor;

a plurality of jamb blocks, each jamb block being extendably coupled to said main portion, each said jamb block being positioned such that each said jamb block is adapted for extending into the channel in the sidewall when the main portion is positioned adjacent the sidewall whereby said ribs are prevented from disengaging the grooved floor whereby said main portion is secured to the bed portion of the vehicle;

a plurality of threaded rods, each threaded rod extending through an associated one of a plurality of complimentarily threaded apertures in said main portion, a distal end of each said threaded rod being rotatably coupled to an associated one of said plurality of jamb blocks such that each said threaded rod is rotatable while said associated jamb block is held in a static position relative to said associated threaded rod whereby each said jamb block is extendable from said main portion by rotating said associated threaded rod;

a plurality of locking nuts, each locking nut being threadedly coupled to a portion of an associated one of said threaded rods, each said locking nut being positionable adjacent said associated threaded aperture for locking each said threaded rod in an extended position;

wherein said main portion includes an indented portion positioned such that said indented portion is adapted for receiving a wheel well extending into the bed portion of the vehicle;

said main portion including a top opening and an end opening;

a plurality of top doors, each of said top doors being coupled to said main portion for selectively covering said top opening in said main portion;

an end door coupled to said main portion for selectively covering said end opening in said main portion.

7. The storage box of claim 3 further comprising:

a plurality of doors, each of said doors being coupled to said main portion for selectively covering an opening in said main portion.

8. The storage box of claim 7 wherein one of said plurality of doors is an end door for covering an end opening in said main portion.

* * * * *